Nov. 11, 1947.  T. L. SHERMAN  2,430,788
CRANKLESS MOTION TRANSMISSION MECHANISM
Filed April 3, 1943  3 Sheets-Sheet 2
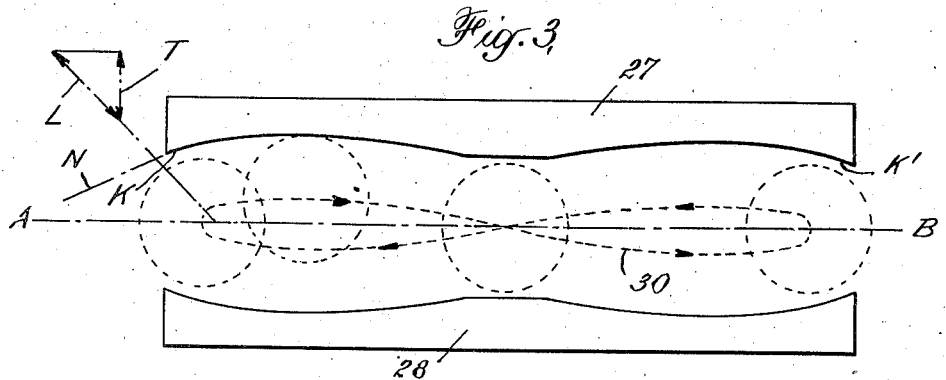
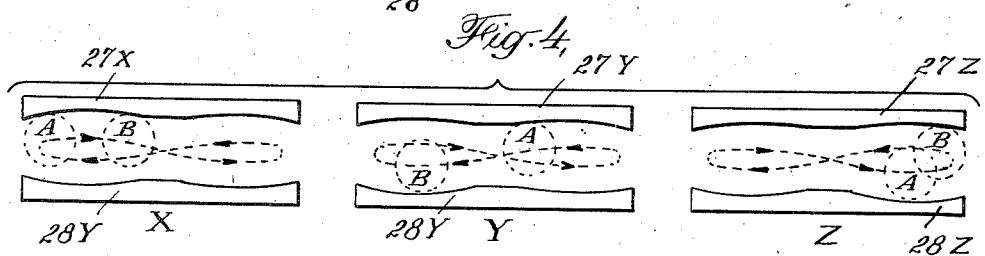
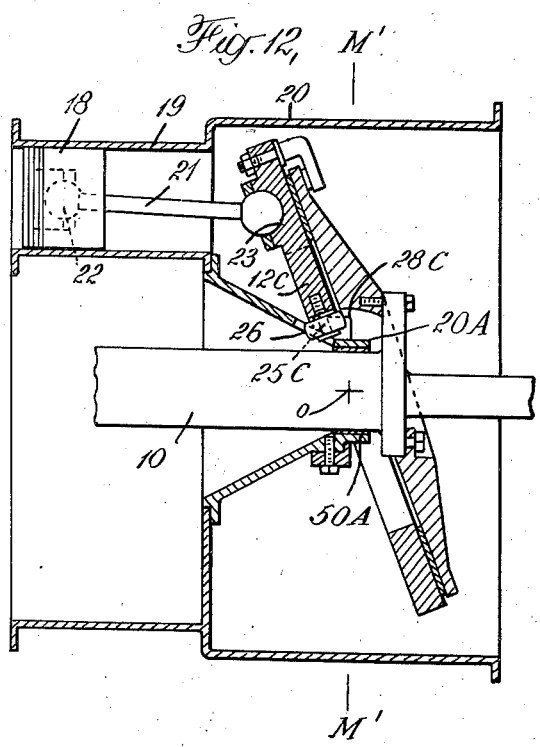
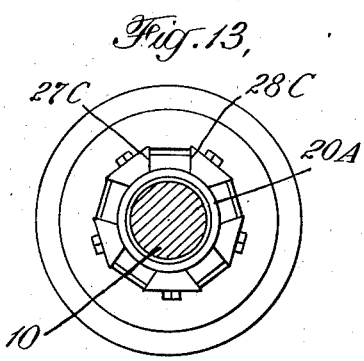
INVENTOR
Thomas L. Sherman
BY
E. W. Marshall
ATTORNEY

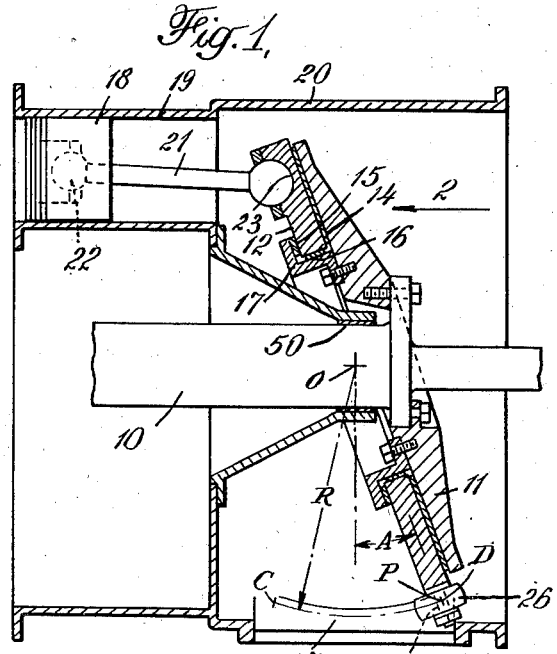
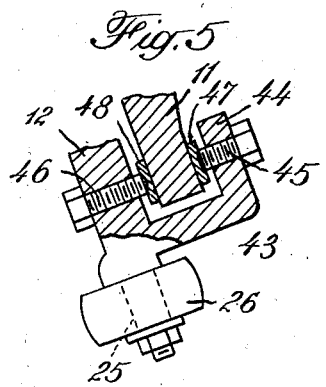
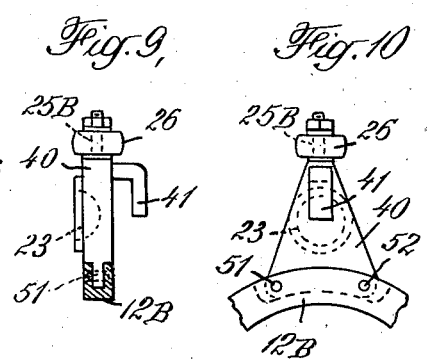
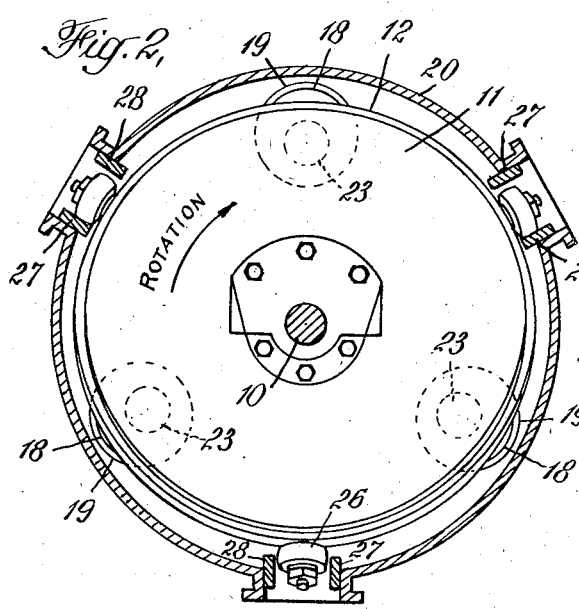
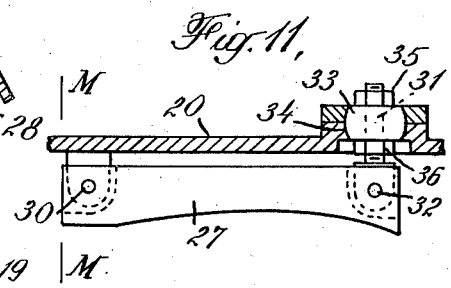

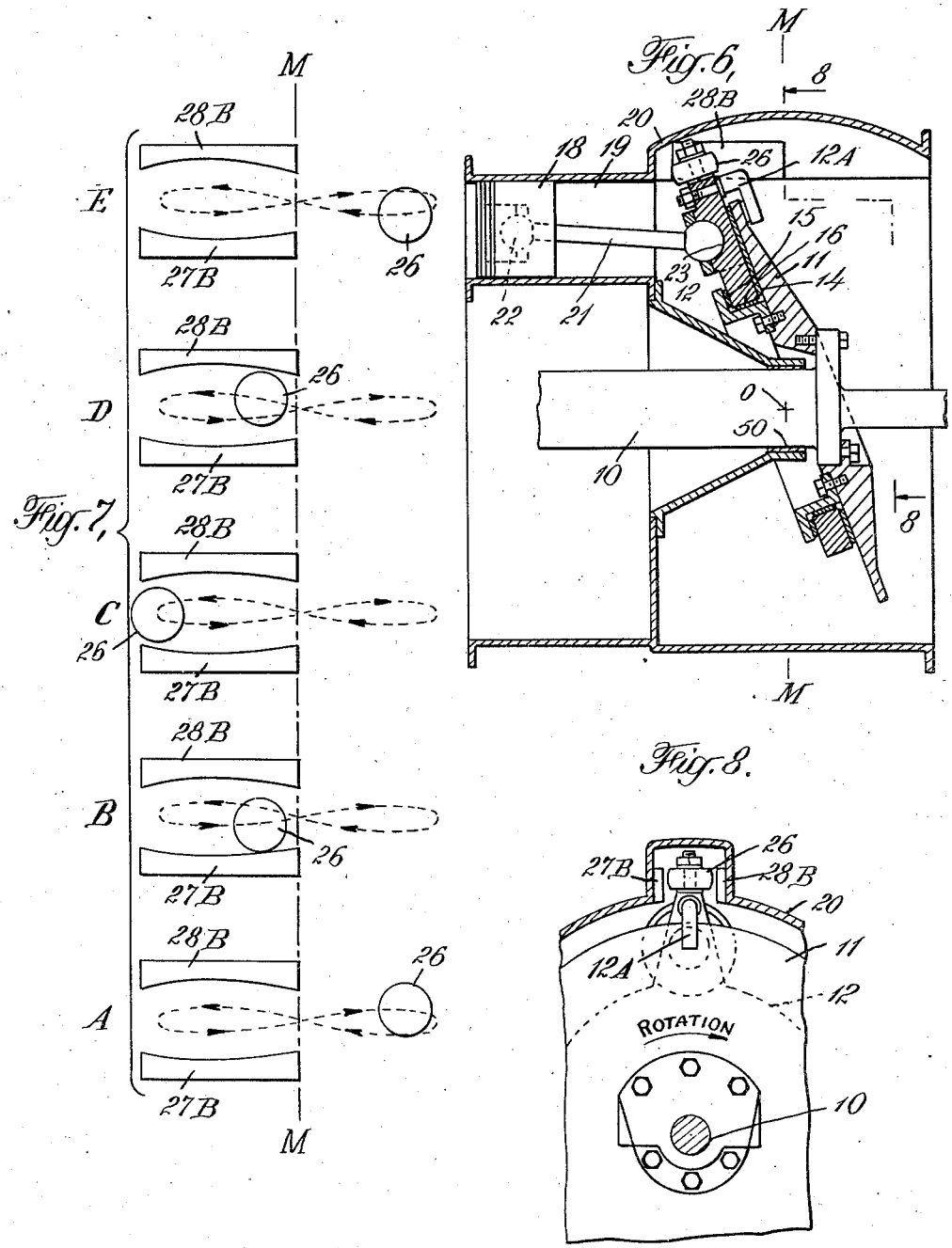

Patented Nov. 11, 1947

2,430,788

UNITED STATES PATENT OFFICE 2,430,788

CRANKLESS MOTION TRANSMISSION MECHANISM

Thomas L. Sherman, Springfield, Ohio, assignor, by mesne assignments, to The Steel Products Engineering Company, Springfield, Ohio, a corporation of Ohio Application April 3, 1943, Serial No. 481,734

25 Claims. (Cl. 74—60)

This invention relates to crankless motion transmitting mechanism, such as slant or swash plate mechanism.

In devices of this character reciprocating motion is converted into rotary motion or vice versa by a rotative slant or swash plate. This may be accomplished through the means of a non-rotative oscillating member or members to which the reciprocating elements are connected and having a slidable engagement with the slant or swash plate. The present invention relates to the means for preventing the oscillating member from rotating.

This invention has for its salient object to provide improved and efficient means for preventing rotation of the oscillating member and imparting to it a symmetrical angular movement or true universal motion. Another object is to provide a plurality of torque reaction guides in the engine for the purpose of carrying the torque load, each guide in turn carrying the load but maintaining a continuous reaction.

Further objects of the invention will appear from the following specification taken in connection with the drawings which form a part of this application and in which:

Figure 1 is a sectional elevation of crankless mechanism having guiding means constructed in accordance with the invention.

Figure 2 is an end view, partly in section, of some of the parts shown in Figure 1, the view being taken in the direction of the arrow 2 in Figure 1 with the slant shown with its maximum angle of dip on a vertical center line.

Figure 3 is an enlarged diagram which shows in plan the fundamental motion of the guiding means relative to the torque reaction guides.

Figure 4 is a set of three diagrams on a smaller scale showing the relative positions of the guiding means and torque reaction guides for the three guide system indicated in Figure 2.

Figure 5 is a sectional view showing guiding means and bearing elements coacting with slant surfaces.

Figure 6 is a sectional elevation of crankless mechanism of modified construction which also embodies the invention.

Figure 7 is a set of diagrams similar to Figure 4 showing the relative positions of the guiding means and torque reaction guides for a five guide system of the type indicated in Figure 6.

Figure 8 is an end view, partly in section, of the upper part of the mechanism shown in Figure 6 with the slant shown with its maximum angle of dip on a vertical center line.

Figure 9 is a sectional side elevation of another modification in which the part which bridges the edge of the slant is a separate member affixed to the oscillating member.

Figure 10 is a front elevation of the parts shown in Figure 9.

Figure 11 is a sectional view of an arrangement for adjustably supporting the torque reaction guides.

Figure 12 is a side elevation of another embodiment of the invention.

Figure 13 is a part end elevation and section through plane M'M' of some of the parts of Figure 12.

In Figure 1 there is shown crankless mechanism comprising a shaft 10 mounted in suitable bearings, one of which, designated by 50, is substantially in the plane of the center of oscillation O of an oscillating member 12 mounted on a slant or swash plate 11 secured to the shaft and slidable thereon through a bearing member 14 and located by bearings 15 and 16 between such oscillating member and a frame 17 affixed to the slant.

The oscillating member 12 receives the reciprocating motion of the pistons, such as 18, which reciprocate in cylinders 19 formed in a casing 20. This motion is communicated through piston rods 21 which are connected at their ends to the pistons and oscillating member through spherical socket bearings 22 and 23.

In order to prevent the oscillating member 12 from rotating with the swash plate, it is provided with a plurality of radially projecting portions or extensions 25 on each of which is mounted a roller 26 having a spherical contact surface. In the form of the invention illustrated in Fig. 2, three equi-spaced projections are provided. This is the minimum practicable number necessary to provide continuous interaction of rollers and reaction guides of the type indicated.

The rollers are disposed in a channel formed by a pair of oppositely facing reaction guides 27 and 28 spaced apart as shown in Figure 3. The surfaces of the guides are symmetrically disposed in relation to an axis A—B which is parallel to the axis of the main shaft 10 and is a partial projection of the circular arc C—D shown in Figure 1.

To secure true universal motion of the oscillating member and avoid rotational inertia effects, the surfaces of the guides 27 and 28 should follow the form of a lemniscate, such as illustrated at 30 in dotted lines in Figure 3. It will be obvious that as viewed in Figure 1, the roller will move through an arc and that the point P disposed at the center of the roller will move through the arc C—D. The radius R of this arc is determined by the distance of the point P from the center O of oscillation of the member 12. The length of the arc C—D is determined by the angle which the fixed slant member makes with the plane at right angles to the main shaft axis. In Figure 1 one-half of this angle is designated as angle A. In addition to the above movement through the arc C—D the point P has an arcuate motion when viewed in the plane at right angles to the main shaft axis. This is a well known mathematical deduction for points on a plane having true symmetrical oscillation. As shown in Figs. 3 and 4, each of the reaction guides has its working surface formed in two similar portions (i. e., a right and left hand portion) of a lemniscate curve, each of such pair of portions being an open curve as shown and limited to less than 90° of a complete curve, the combined curve thus forming less than 180° of a complete curve. The two working portions are separated from each other by a central portion of greater or less extent depending upon the number of guides. However during the time that any of the rollers traverses the central portion of its guide, the thrust during that part of the cycle is taken by cooperative contact between one of the other guides and its associated roller.

The spacing of the guides 27 and 28 is determined by the size of the roller and the lateral (arcuate) displacement of the point P, due allowance being made for mechanical clearance. The motion of the point P on the lemniscate is indicated by the arrows on curve 30 in Figure 3. In engines the guide plate 27 will be the one carrying the torque reaction to the load imposed by the roller. It will be noted that at the beginning K and end K' of the lemniscate, the load L on the roller would be large in comparison with the tangential or torque load T. Practically, therefore, the beginning of useful coaction starts at some little distance from the ends of the strokes. This limitation determines the minimum number of reaction guides as three, as in Figures 2 and 4. They must be equally spaced but may have any circumferential relation to the positions of the pistons and its connections.

Figure 4 shows the relative positions of the rollers in the three guides at X, Y and Z for the direction of rotation shown in Figure 2. For position A, the roller in X is about to engage reaction guide 27X, the roller in Y is about to leave guide 27Y, whereas the roller in Z is spaced from guide 27Z. At a later interval B, the roller in X is about to leave 27X, the roller in Y is spaced from 27Y, whereas the roller in Z is about to engage 27Z. If there were a sudden change in the direction of imposed torque the rollers would shift to engage the guides 28 and no longer contact guides 27, a small running clearance being provided between the rollers and the opposite sets of guides. It will be evident that the total working contact of each one of the rollers with the corresponding one of guides 27X, 27Y and 27Z (or 28X, 28Y and 28Z as the case may be) will take place over less than 180° of the revolution of the shaft, and thus will occur over less than half of the cycle. Further, each succeeding contact between a roller and its associated guide occurs before a preceding contact between a roller and its guide has been terminated so that there is a progressive overlapping of the working engagement of the respective rollers and their associated guides which provides a continuous and smooth transfer of the reaction load.

In order to allow for variations introduced by manufacturing irregularities, etc., it is desirable to provide an entering or lead condition at the ends of the guide plates, as indicated at N in Figure 3. This can be arranged as tangential to the path of the coacting surface of the roller.

Investigation of the conditions of rotation of the roller 26 during its cycle of engagement with the reaction guide surfaces shows that in the system heretofore discussed a forced change in the direction of rotation takes place causing skidding and consequent damage to the reaction guide surfaces at point of engagement. Examining Figure 4 it will be seen that as the roller in A position in guide Y leaves contact with the guide 27 it has clockwise rotation. Later when it again comes into engagement with the same guide in similar relation to the position A on 27X, a counter-clockwise rotation is demanded. As the magnitude of the condition is a direct function of the speed of rotation of engine, the scheme is only suited for slow speed mechanisms.

A preferred and superior form of the invention is indicated in Figures 6 and 8 in which the reaction guides 27B, 28B are disposed at one side only of the plane through the center of oscillation O and at right angles to the main shaft axis. The reaction guides may lie wholly either to left or right of this plane designated MM. Since the roller can now only contact any particular guide for one-half the arc of oscillation, the theoretical length of contact is reduced to 90° of main shaft rotation. Practically owing to end condition, as previously discussed, it is only possible to use about 72° as a maximum. This implies that the minimum number of reaction guides possible is five.

Figure 7 shows the relative positions of the rollers and guides for five equi-spaced pairs of reaction guides A, B, C, D and E. As drawn, the roller in C is at the end of its stroke and is midway disposed between the guides. Owing to the elimination of the unfavorable end conditions this roller has no contact with either guide surface. Assuming that the slant has clockwise rotation (Fig. 8) and that the guides A, B, C, D, E are similarly disposed, the guides 27B will carry the torque reaction. The roller in B only will be carrying the torque load as the other rollers are disposed as indicated. At a later interval, the roller in C will come into contact with 27B and the roller in B will become unloaded as it moves outwards out of the guide system. Upon analysis it will be evident that the working engagement of the respective rollers and their associated guides proceeds in direct sequence and in the direction of rotation of the engine shaft.

Considering the relative rotations of roller with respect to guide surfaces, it will be seen that the roller contacts the same guide in the same direction always. There is no demand for any change in the direction of rotation of the roller.

Another practical advantage also results in that the guides momentarily engaged in the transference of roller reaction are at minimum angular intervals apart, and so are less disturbed by mechanical irregularities as compared to the system illustrated in Figures 2 and 4.

In view of the fact that the accuracy of engagement of rollers and guides is dependent on the maintenance of the center of oscillation O on the main shaft axis, a shaft bearing 50, Figures 1 and 6, is disposed substantially at such center of oscillation.

In Figure 5 the roller 26 is mounted on extension 25 in close positioned relationship with a bridge member 43 with lug 44 embracing the slant 11. Bearing elements 47 and 48 are provided with adjustment means 45 and 46. These serve to carry lateral reactions arising from contact of roller 26 with the reaction guide surfaces.

In Figs. 6 and 8 the bridge member 12A is shown as a separate piece from oscillating member 12 and is located directly opposite the piston rod socket connection to same. The positioning of the roller 26 on the radial line joining center line of cylinder and main shaft axis, as indicated in Figure 8, provides the greatest economy of construction and in engines makes possible the transference of major torque loading directly to the adjacent guide surfaces.

Figures 9 and 10 show a modification in which the housing 40 for the piston rod socket 23, extension 25B and bridge portion 41 embracing slant 11 are separate parts from the oscillating member 12B. They are attached to the latter by pin or pivotal joints 51 and 52. This arrangement permits disassembly without removing the member 12B.

Figure 11 shows a mounting of the reaction guide member 27 which permits adjustment to offset manufacturing irregularities and those arising from running conditions. The guide 27A is pivoted near its center, i. e., proximate to plane MM, Figure 6, to the casing 20 as at 30. At the other end is a link 31 pivoted to the guide at 32 and threaded into a spherical collar 33. This collar is mounted in a spherical bearing 34 formed in the casing 20 or affixed thereto. The position of the collar 33 on the link 31 may be adjusted and held in place by lock nuts 35, 36.

Figure 12 shows an alternative arrangement in which the rollers 26 are located on radial extensions 25C projecting inwardly from oscillating member 12C and coacting with guides 27C and 28C, having formed surfaces of similar shape to that shown in Figure 7. Five sets of guide surfaces are indicated. These are positioned to left of plane M'M' in Fig. 12. They may alternatively be placed to the right of such plane. In practice, these guide surfaces may be formed on blocks, Figure 13, attached to the bearing housing 20A or as a gear ring having tooth space of the required contour.

It is to be understood, of course, that the number of guides referred to in the different arrangements are minimums only and that greater number of equi-spaced guides in each case may be used. In general, the number of pairs of guides will be the same as the number of pistons.

Although certain specific embodiments of the invention have been particularly shown and described, it will be understood that the invention is capable of further modifications and that changes in the construction and in the arrangement of the various cooperating parts may be made without departing from the spirit and scope of the invention as expressed in the following claims.

What I claim is:

1. In a swash plate mechanism having a shaft and a slant thereon, an oscillatory member slidably mounted on the slant, projections extending radially from said member, and stationary reaction guides arranged to engage said projections respectively to prevent rotation of the oscillatory member, said reaction guides each having surfaces in the form of portions of a lemniscate curve of less than 180° and each engaging its respective projection less than half of each revolution of the shaft.

2. In a swash plate mechanism having a shaft and a slant thereon, an oscillatory member slidably mounted on the slant, projections extending radially from said member, and stationary reaction guides having spaced surfaces arranged to engage said projections respectively to prevent rotation of the oscillatory member, said surfaces being in the form of portions of a lemniscate curve of less than 180° and arranged to establish progressive overlapping engagement between each succeeding projection and its respective guide before termination of working engagement between a preceding projection and its respective guide.

3. In a swash plate mechanism having a shaft, a slant thereon and angularly spaced pistons, an oscillatory member slidably mounted on the slant, connections between the pistons and the oscillatory member, projections etxending radially from said member in angular alinement with the piston connections, stationary reaction guides arranged to engage said projections respectively to prevent rotation of the oscillatory member, each said reaction guide having a pair of surfaces in the form of portions of a lemniscate curve the total working contact of both of which with its associated projection is less than 180° of shaft revolution.

4. In a swash plate mechanism having a shaft, a slant thereon and angularly spaced pistons, an oscillatory member slidably mounted on the slant, connections between the pistons and the oscillatory member more than two, projections extending radially from said member in angular alinement with the piston connections, and a stationary reaction guide cooperating with each said projection in predetermined overlapping sequence to prevent rotation of the oscillatory member, the working surface of each said guide being in the form of a portion of a lemniscate curve with its axis parallel wih the axis of the shaft.

5. In a swash plate mechanism having a shaft and a slant thereon, an oscillating member slidably mounted on the slant, projections extending radially from said member, rollers on said projections, and stationary reaction guides cooperating with said roller respectively, each said guide having spaced surfaces on opposite sides of the roller in the form of portions of a lemniscate curve of less than 180°.

6. In a swash plate mechanism having a shaft and a slant thereon, an oscillatory member slidably mounted on the slant, projections extending radially from said member, and adjustable reaction guides arranged to engage said projections respectively in predetermined sequence to prevent rotation of the oscillatory member, said reaction guides each having surfaces in the form of portions of a lemniscate curve the total contact of any one of which with its associated projection is less than 180° of revolution of the shaft.

7. In a swash plate mechanism having a shaft and a slant thereon, an oscillatory member mounted on the slant having a surface slidable on a surface of the slant, projections extending radially from said member, adjustable guides arranged to engage one side of said projections respectively to prevent rotation of the oscillatory member, said guides having surfaces in the form of portions of a lemniscate curve with its axis parallel with the axis of the shaft, and means for adjusting the positions of the guides.

8. In a swash plate mechanism having a shaft, a slant thereon and a plurality of pistons, an oscillatory member slidably mounted on the slant, connections between the pistons and the oscillatory member, a plurality of projections extending radially from said member opposite the piston connections and in angular alinement therewith, and reaction guides arranged to engage said projections to prevent rotation of the oscillatory member, each of said guides having a pivoted member with a surface in the form of a portion of a lemniscate curve symmetrical in relation to a line parallel with the axis of the shaft, and means for adjusting the position of said pivoted member.

9. In a swash plate mechanism having a shaft and a slant thereon, an oscillatory member slidably mounted on the slant, projections extending outwardly from said member, and stationary reaction guides arranged to engage said projections respectively to prevent rotation of the oscillatory member, said guides each having a pair of spaced surfaces in the form of open portions of a lemniscate curve symmetrical in relation to a line parallel with the axis of the shaft.

10. In a swash plate mechanism having a shaft and a slant thereon, an oscillatory member slidably mounted on the slant, projections extending inwardly from said member, and stationary reaction guides arranged to engage said projections respectively to prevent rotation of the oscillatory member, said reaction guides each having a pair of spaced surfaces in the form of open portions of a lemniscate curve symmetrical in relation to a line parallel with the axis of the shaft.

11. In a swash plate mechanism having a shaft and a slant thereon, an oscillatory member slidably mounted on one side of the slant having a portion extending over the peripheral edge of the slant and the other side of the slant, a bearing element between said member and a side of the slant a bearing element between said extending portion and the other side of the slant, projections extending outwardly from said member, and stationary reaction guides arranged to engage said projections respectively to prevent rotation of the oscillatory member.

12. In a swash plate mechanism having a shaft and a slant thereon, an oscillatory member slidably mounted on one side of the slant, a bridge pivotally mounted on said member extending over the peripheral edge of the slant and engaging the other side of the slant, projections extending outwardly from said bridge, and stationary reaction guides arranged to engage said projections respectively to prevent rotation of the oscillatory member.

13. A swash plate mechanism comprising a shaft, a slant thereon, an oscillatory member mounted on the slant, means for preventing rotation of the oscillatory member and a bearing for the shaft substantially at the center of oscillation.

14. In a swash plate mechanism having a shaft and a slant thereon, an oscillatory member slidably mounted on the slant, projections extending radially from said member, and stationary reaction guides located at one side only of a plane normal to the shaft containing the center of oscillation arranged to engage said projections respectively in predetermined sequence to prevent rotation of the oscillatory member.

15. In a swash plate mechanism having a shaft and a slant thereon, an oscillatory member slidably mounted on the slant, projections extending radially from said member, and stationary reaction guides located at one side only of a plane normal to the shaft containing the center of oscillation having spaced surfaces on opposite sides of the projections said guides being arranged to engage said projections respectively to prevent rotation of the oscillatory member.

16. In a swash plate mechanism having a shaft and a slant thereon, an oscillatory member slidably mounted on the slant, projections extending radially from said member, and stationary reaction guides located at one side only of a plane normal to the shaft containing the center of oscillation having spaced surfaces on opposite sides of the projection arranged to engage said projections respectively to prevent rotation of the oscillatory member, said guides having surfaces in the form of portions of a lemniscate curve symmetrical in relation to a line parallel with the axis of the shaft.

17. In a swash plate mechanism having a shaft and a slant thereon, an oscillatory member slidably mounted on the slant, angularly spaced projections extending radially from said member, and angularly spaced reaction guides located at one side only of a plane normal to the shaft containing the center of oscillation having working engagement with said projections respectively in predetermined sequence.

18. In a swash plate mechanism having a shaft and a slant thereon, an oscillatory member slidably mounted on the slant, angularly spaced projections extending radially from said member, rollers on said projections, and angularly spaced reaction guides located at one side only of a plane normal to the shaft containing the center of oscillation, said guides having surfaces on opposite sides of the respective projections, for progressive working engagement therewith.

19. In a swash plate mechanism having a shaft and a slant thereon, an oscillatory member slidably mounted on the slant, angularly spaced projections extending radially from said member, angularly spaced reaction guides located at one side only of a plane normal to the shaft containing the center of oscillation having surfaces in the form of portions of a lemniscate curve symmetrical to a line parallel to the axis of the shaft, said surfaces having progressive working engagement with said respective projections in predetermined sequence.

20. In a swash plate mechanism having a shaft and a slant thereon, an oscillatory member slidably mounted on the slant, angularly spaced projections extending radially from said member, rollers on said projections, angularly spaced stationary reaction guides located at one side only of a plane normal to the shaft containing the center of oscillation having spaced surfaces arranged to engage said rollers respectively to prevent rotation of said oscillatory member whereby rotation imparted to the rollers by their engagement with the guiding surfaces will be in one direction.

21. A swash plate mechanism as defined in claim 13 in which the means for preventing rotation of the oscillatory member includes projections on said member, and non-rotating reaction guides having surfaces in the form of portions of lemniscate curve cooperating with said projections respectively to prevent rotation of said oscillatory member.

22. In a swash plate mechanism having a shaft and a slant thereon, an oscillatory member slidably mounted on the slant, a plurality of angularly spaced projections extending from said member, and a plurality of stationary reaction guides located at one side only of a plane normal to the shaft containing the center of oscillation and arranged to engage said projections respectively in predetermined sequence, said reaction guides and said cooperating projections being so spaced circumferentially that a continuity of guidance of the projections is maintained throughout rotation.

23. In a swash plate mechanism having a shaft and a slant thereon, an oscillatory member slidably mounted on the slant, angularly spaced projections extending from said member, and stationary reaction guides arranged to engage said projections respectively in predetermined sequence to prevent rotation of the oscillatory member, said reaction guides having surfaces of limited extent such that a continuity of coaction between each said guide and its associated projection is limited to less than 90° of rotation of said shaft.

24. The mechanism as defined in claim 23 in which the number of said reaction guides is at least five.

25. In a swash plate mechanism having a shaft and a slant thereon, an oscillatory member slidably mounted on the slant, a plurality of angularly spaced projections extending from said member, and a plurality of stationary reaction guides arranged to engage said projections to assume the thrust load on said oscillatory member, said reaction guides and said cooperating projections being arranged to have cooperating working engagement with each other in direct sequence in the direction of rotation of said shaft.

THOMAS L. SHERMAN.

REFERENCES CITED

The following references are of record in the file of this patent:

UNITED STATES PATENTS

| Number | Name | Date |
| --- | --- | --- |
| 1,233,635 | Almen (Re. 15,442) | July 17, 1917 |
| 1,948,827 | Redrup | Feb. 27, 1934 |
| 2,151,614 | Nevatt et al. | Mar. 21, 1939 |
| 1,819,715 | Le Bret | Aug. 18, 1931 |
| 1,355,485 | Lleo et al. | Oct. 12, 1920 |

FOREIGN PATENTS

| Number | Country | Date |
| --- | --- | --- |
| 665,298 | Germany | Sept. 28, 1938 |
| 237,478 | Great Britain | July 30, 1925 |